(12) United States Patent
Miller et al.

(10) Patent No.: US 7,991,373 B2
(45) Date of Patent: Aug. 2, 2011

(54) SIGNAL FILTERING SYSTEM AND RELATED METHODS

(75) Inventors: Richard M. Miller, Gilbert, AZ (US); Cris M. Mamaril, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 503 days.

(21) Appl. No.: 12/195,887

(22) Filed: Aug. 21, 2008

(65) Prior Publication Data

US 2009/0054026 A1    Feb. 26, 2009

Related U.S. Application Data

(60) Provisional application No. 60/972,871, filed on Sep. 17, 2007.

(51) Int. Cl.
  *H04B 1/06* (2006.01)
(52) U.S. Cl. ......... 455/266; 455/260; 455/334
(58) Field of Classification Search .......... 455/255–260, 455/266, 313, 323, 324, 334, 338, 339
See application file for complete search history.

(56) References Cited

U.S. PATENT DOCUMENTS

| | | | |
|---|---|---|---|
| 6,256,508 B1 * | 7/2001 | Nakagawa et al. | 370/312 |
| 6,859,691 B2 | 2/2005 | Collins et al. | |
| 7,027,833 B1 * | 4/2006 | Goodman | 455/553.1 |
| 7,206,564 B2 * | 4/2007 | Yang et al. | 455/307 |
| 7,228,104 B2 | 6/2007 | Collins et al. | |
| 7,590,205 B2 * | 9/2009 | Zipper | 375/350 |

* cited by examiner

*Primary Examiner* — Nhan Le
(74) *Attorney, Agent, or Firm* — Booth Udall, PLC

(57) ABSTRACT

A signal filtering system for a frequency reuse system. A first implementation may include a downlink baseband signal, coupled to a downlink bandwidth filter, including a composite received signal including at least an interfering signal and a signal of interest, each having a composite bandwidth, a first bandwidth, and a second bandwidth, respectively. An uplink baseband signal may be included, coupled to an uplink bandwidth filter, having a replica of the interfering signal corresponding with the interfering signal and having an interference bandwidth. A baseband processing module may be coupled with the downlink bandwidth filter and the uplink bandwidth filter and may be configured to cancel the interfering signal from the composite received signal using the replica of the interfering signal. The downlink bandwidth filter may be configured to reduce the composite bandwidth and the uplink bandwidth filter may be configured to reduce the interference bandwidth.

20 Claims, 7 Drawing Sheets

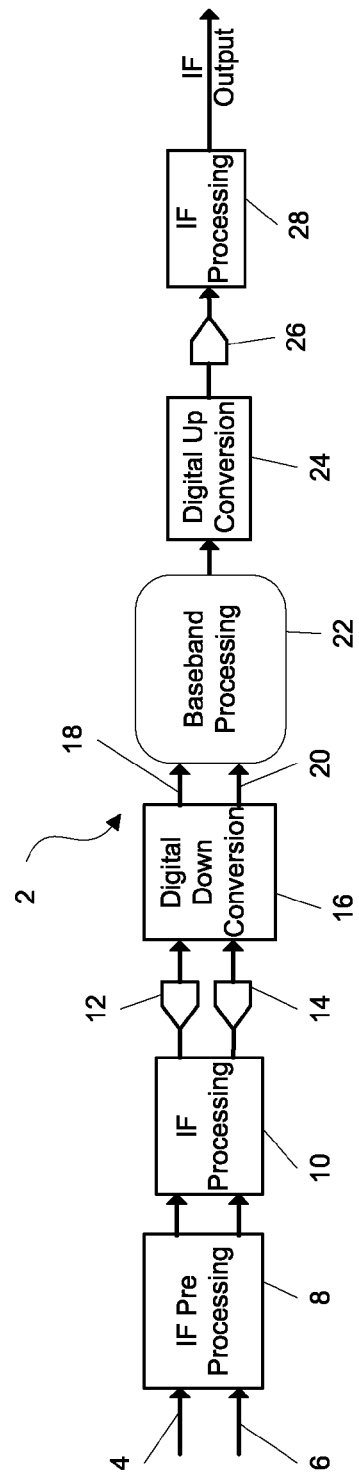
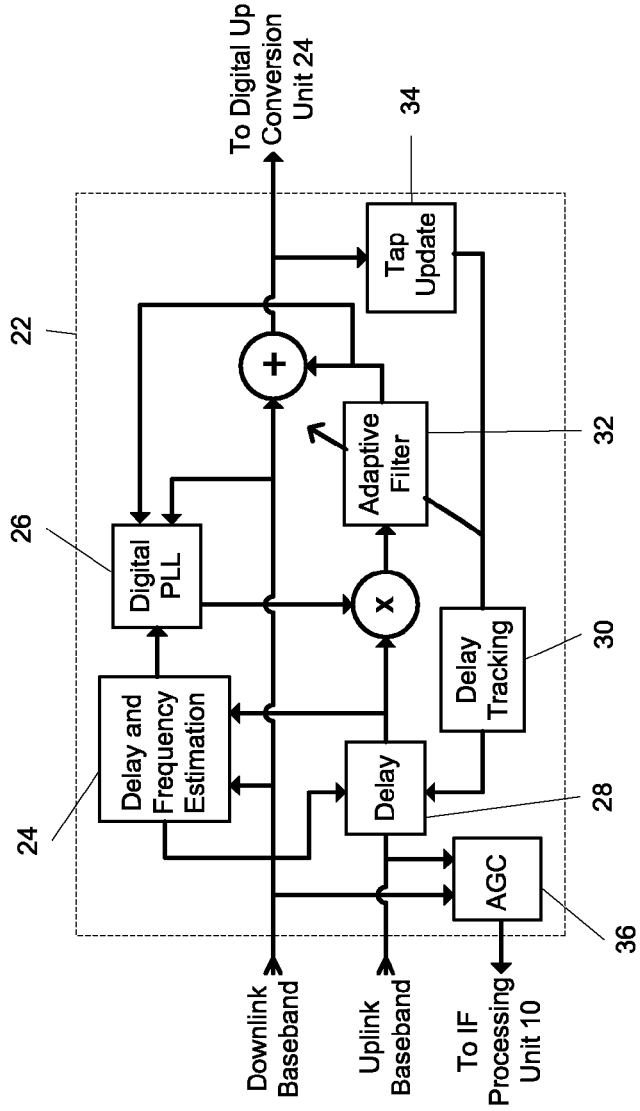
FIG. 1A
FIG. 1B

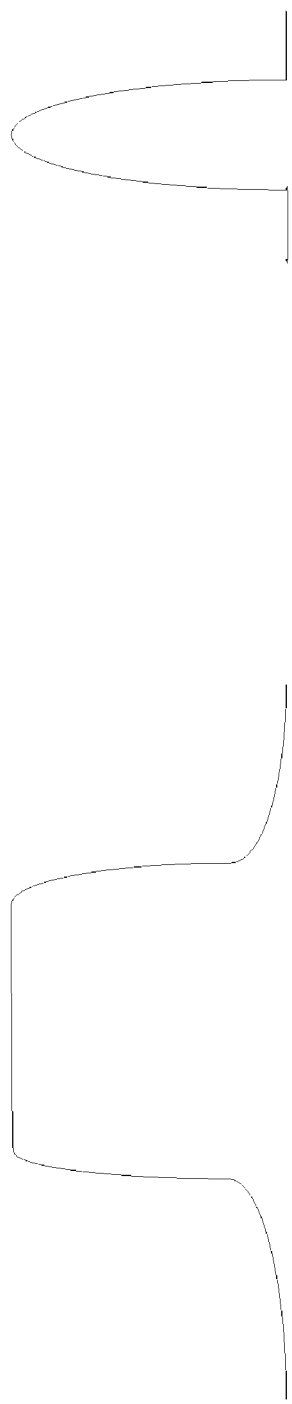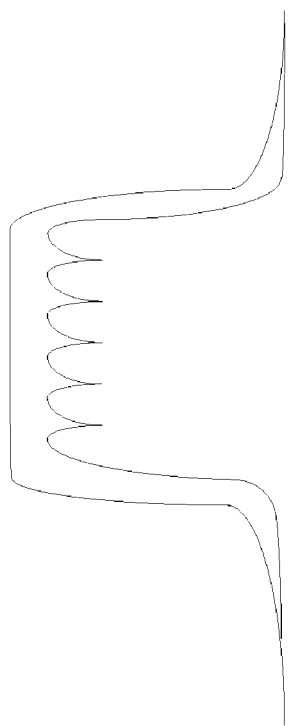

SIGNAL FILTERING SYSTEM AND RELATED METHODS

CROSS REFERENCE TO RELATED APPLICATIONS

This document claims the benefit of the filing date of U.S. Provisional Patent Application 60/972,871, entitled "Interference Signal Suppression Techniques" to Miller et al., which was filed on Sep. 17, 2007, the disclosure of which is hereby incorporated entirely herein by reference.

BACKGROUND

1. Technical Field

Aspects of this document relate generally to telecommunication systems, such as satellite, wired, and wireless systems.

2. Background Art

Conventional telecommunication systems transmit signals across wired and wireless communication channels. The signals transmitted by conventional systems may take the form of modulated electromagnetic waves traveling through a wire or through open space. In various conventional communication systems, the signals being transmitted occupy a certain frequency position in a range of frequencies available in a particular telecommunication channel being utilized. The width of frequencies available in the channel is often called its bandwidth, and each of the signals being transmitted in the channel also has its own bandwidth generally narrower than the available channel bandwidth. In many conventional telecommunication systems, particularly satellite systems, various factors such as antenna size influence the bandwidth available for transmitting inbound and outbound signals.

SUMMARY

Implementations of frequency reuse systems may include various implementations of signal filtering systems. A first signal filtering system implementation may include a downlink baseband signal including a composite received signal including at least an interfering signal and a signal of interest. The composite received signal may have a composite bandwidth, the interfering signal may have a first bandwidth, and the signal of interest may have a second bandwidth. The downlink baseband signal may be coupled with a downlink bandwidth filter. Implementations may also include an uplink baseband signal having a replica of the interfering signal having an interference bandwidth. The replica of the interfering signal corresponds with the interfering signal. The uplink baseband signal may be coupled to an uplink bandwidth filter. A baseband processing module may be coupled with the downlink bandwidth filter and the uplink bandwidth filter and may be configured to cancel the interfering signal from the composite received signal using the replica of the interfering signal. The downlink bandwidth filter may be configured to reduce the composite bandwidth of the composite received signal and the uplink bandwidth filter may be configured to reduce the interference bandwidth of the replica of the interfering signal. An impulse response of the downlink bandwidth filter and an impulse response of the uplink bandwidth filter may be the same.

A second signal filtering system implementation may include a downlink bandwidth filter coupled to a downlink baseband input and may be configured to receive a downlink baseband signal including a composite received signal including at least a interfering signal and a signal of interest. The composite received signal may have a composite bandwidth, the interfering signal may have a first bandwidth, and the signal of interest may have a second bandwidth. An uplink bandwidth filter may be coupled to an uplink baseband input and may be configured to receive an uplink baseband signal including a replica of the interfering signal having an interference bandwidth. The replica of the interfering signal may correspond with the interfering signal. A baseband processing module may be coupled with the downlink bandwidth filter and the uplink bandwidth filter and may be configured to cancel the interfering signal from the composite received signal using the replica of the interfering signal. The downlink bandwidth filter may be configured to reduce the composite bandwidth of the composite received signal and the uplink bandwidth filter may be configured to reduce the interference bandwidth of the replica of the interfering signal. An impulse response of the downlink bandwidth filter and an impulse response of the uplink bandwidth filter may be the same.

Particular implementations of the first and second implementations of signal filtering systems may include one, all, or some of the following.

The downlink bandwidth filter may be further configured to reduce the composite bandwidth to at least the second bandwidth.

The uplink bandwidth filter may be configured to reduce the interference bandwidth to substantially correspond with the second bandwidth.

The system may further include an uplink baseband complex rotator coupled with the uplink baseband signal. The uplink baseband complex rotator may be configured to translate a frequency of the replica of the interfering signal of the uplink baseband signal.

The composite received signal may further include three or more signals and one of the three or more signals may be the interfering signal.

The system may further include two or more demodulators corresponding with two or more signals of interest included in the three or more signals included in the composite received signal.

The baseband processing module may include a delay module, a delay and frequency estimation module, a delay tracking module, a digital phase locked loop module, an adaptive filter, a tap update, and an automatic gain control module all operatively coupled together.

Frequency reuse system implementations may utilize implementations of a method of bandwidth filtering. The method may include receiving a downlink baseband signal including a composite received signal including at least an interfering signal and signal of interest. The composite received signal may have a composite bandwidth, the interfering signal may have a first bandwidth, and the signal of interest may have a second bandwidth. The downlink baseband signal may be coupled with a downlink bandwidth filter. The method may further include receiving an uplink baseband signal including a replica of the interfering signal having an interference bandwidth. The replica of the interfering signal may correspond with the interfering signal. The method may also include cancelling the interfering signal from the composite received signal using the replica of the interfering signal and reducing the composite bandwidth of the composite received signal with the downlink bandwidth filter. The method may also include reducing the interference bandwidth of the replica of the interfering signal to substantially correspond with the second bandwidth using an uplink bandwidth filter coupled with the uplink baseband signal.

Implementations of a method of bandwidth filtering may utilize one, all, or some of the following.

Reducing the composite bandwidth of the composite received signal may include reducing the composite bandwidth to at least the second bandwidth.

An impulse response of the downlink bandwidth filter and an impulse response of the uplink bandwidth filter may be the same.

The method may further include translating a frequency of the replica of the interfering signal using an uplink baseband complex rotator coupled with the uplink baseband signal.

The method may also include transmitting the signal of interest to a demodulator.

The method may also include digitally down converting a bandlimited intermediate frequency signal with a digital down conversion module to form the downlink baseband signal prior to receiving the baseband signal including the composite received signal.

Frequency reuse system implementations may utilize implementations of a method of obtaining a signal of interest from a plurality of signals of interest included in a composite signal. The method may include receiving a composite signal containing a interfering signal and plurality of signals of interest and centering a replica of the interfering signal relative to the composite signal by frequency translating the replica of the interfering signal using a complex rotator. The method may also include reducing the composite signal to at least the bandwidth of a desired one of the plurality of signals of interest using a downlink bandwidth filter to form a filtered composite signal including the desired one of the plurality of signals of interest and a remaining portion of the interfering signal within the bandwidth of the desired one of the plurality of signals of interest. The method may include reducing the bandwidth of the replica of the interfering signal to at least the bandwidth of the desired one of the plurality of signals of interest using an uplink bandwidth filter to form a filtered replica of the interfering signal. The method may also include canceling the remaining portion of the interfering signal using the filtered replica of the interfering signal to produce the desired one of the plurality of signals of interest.

Implementations of a method of obtaining a signal of interest from a plurality of signals of interest included in a composite signal may include one, all, or some of the following:

The method may further include repeating centering the replica of the interfering signal relative to the composite signal, reducing the composite signal, reducing the bandwidth of the replica of the interfering signal, and canceling the remaining portion of the interfering signal for each one of the plurality of the signals of interest included in the composite signal.

The method may further include sending each one of the plurality of signals of interest to a corresponding one of a plurality of demodulators.

The method may further include digitally down converting a bandlimited intermediate frequency signal with a digital down conversion module to form a downlink baseband signal prior to receiving a baseband signal including the composite signal.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

A variety of implementations will hereinafter be described in conjunction with the appended drawings, where like designations denote like elements, and:

FIG. 1A is a block diagram of an implementation of a portion of a frequency reuse system;

FIG. 1B is a block diagram of an implementation of a baseband processing module illustrated in FIG. 1A;

FIG. 2A illustrates an implementation of a carrier signal with a bandwidth;

FIG. 2B illustrates an implementation of a carrier signal with a bandwidth narrower than the carrier signal implementation illustrated in FIG. 2A;

FIG. 2C illustrates an implementation of a carrier in carrier signal illustrating multiple narrower bandwidth combined inbound signals combined with a wider bandwidth outbound carrier signal;

DESCRIPTION

Figure 3:
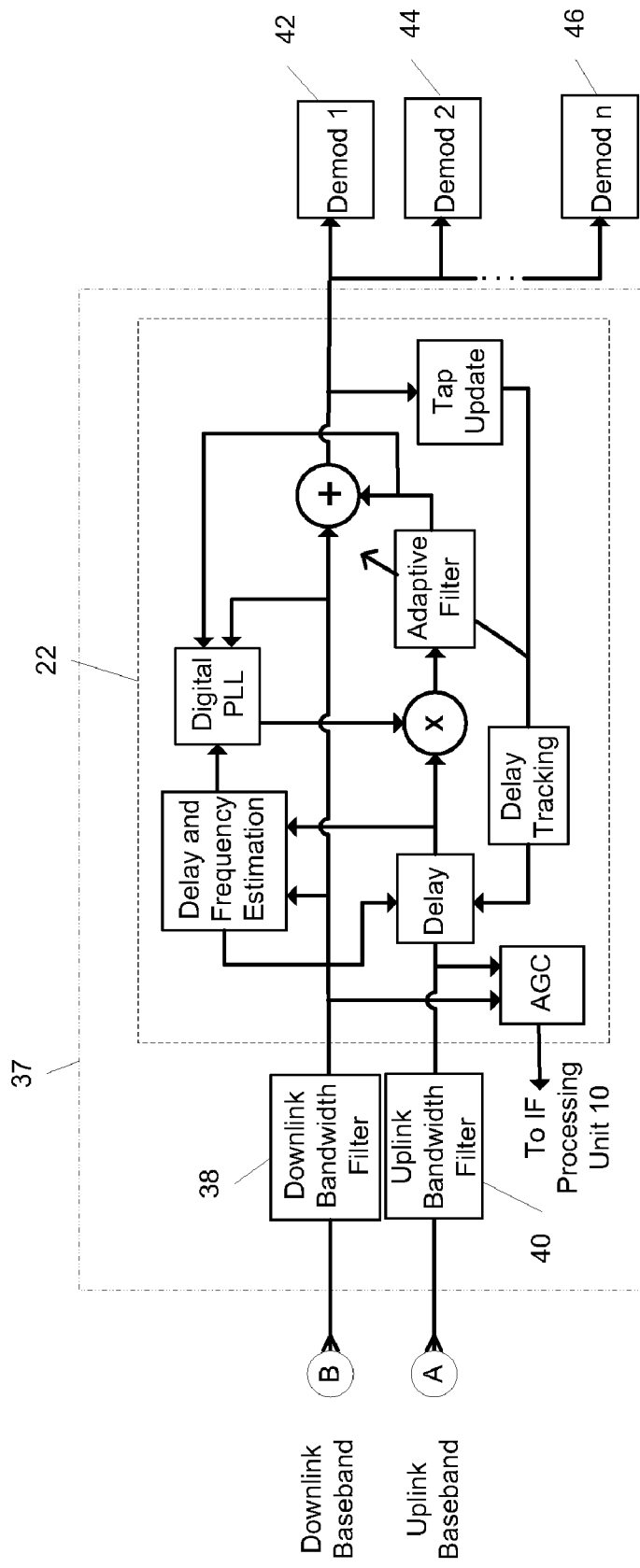
FIG. 3 is a block diagram of an implementation of a signal filtering system.

This disclosure, its aspects and implementations, are not limited to the specific components or assembly procedures disclosed herein. Many additional components and assembly procedures known in the art consistent with the intended signal filtering system and/or frequency reuse system and/or assembly procedures for a signal filtering system and/or frequency reuse system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such signal filtering systems, frequency reuse systems, and implementing components, consistent with the intended operation.

Referring to FIG. 1A, an implementation of a portion of a frequency reuse system 2 is illustrated. Relevant teachings regarding the structure and use of frequency reuse systems may be found in U.S. Pat. No. 7,228,104 to Collins et al. entitled "Adaptive Canceller for Frequency Reuse Systems" issued Jun. 5, 2007, the disclosure of which is hereby incorporated herein by reference. The portion of the system 2 illustrated includes intermediate frequency processing and digital baseband processing segments. As illustrated, the system 2 includes two intermediate frequency (IF) inputs, a downlink IF input 4 and an uplink IF input 6. The downlink IF input 4 is configured to receive a composite signal, or downlink signal, from a satellite or other transmitting or downlinking device. The composite signal includes an uplink signal, or interfering signal, sent to the satellite or other device and one or more downlink signals originating from another remote location and which contain the data desired for output. Because, as is discussed at length in the patent to Collins et al., the frequency bandwidth assigned to the uplink signal is also used to convey the composite signal, the uplink and the one or more downlink signals in the composite signal are additively combined, and accordingly, occupy the same bandwidth space. Accordingly, the uplink signal must be subtracted from the composite signal in order to enable retrieval of the desired one or more downlink signals.

Because the composite signal may either come from a transmitter of greater size or power, may include multiple uplink signals from multiple locations (as in a hub and spoke configuration), or may be transmitted using a different frequency band, a composite signal may have wider bandwidth than the corresponding uplink signal contained in it. Accordingly, the uplink signal contained in the composite signal may occupy only a portion of the frequency band. For the exemplary purposes of this disclosure, such a situation may result from a T1 (1.544 Mbps) satellite link utilizing ½ rate quadrature phase-shift keying (QPSK) modulation, where the total bandwidth the link utilized is only 2 MHz of the total 10 MHz conventionally available for processing by implementations of frequency reuse systems 2. Another example occurs when a bi-directional link with an asymmetric bandwidth ratio is utilized, where a composite signal with greater bandwidth contains an uplink signal of narrower bandwidth. Referring to FIG. 2A, an implementation of such a composite signal is illustrated, showing the width of the frequency band the signal occupies.

Referring to FIG. 2B, an implementation of such an uplink signal, or interfering signal, is illustrated, showing that the frequency width occupied by the interfering signal is generally narrower than the composite signal. Referring to FIG. 2C, an implementation of a composite signal like that illustrated in FIG. 2A is illustrated with multiple uplink signals superimposed, indicating how, in particular implementations of frequency reuse systems 2, the composite signal may include numerous uplink signals resulting from the combination of uplink signals from multiple remote sites, one or more of which may be signals of interest. A composite signal like that illustrated in FIG. 2C may result from a hub and spoke type satellite or other network configuration. In other particular implementations, however, the bandwidth difference between the uplink and composite signals may be the result of many other factors, such as, by non-limiting example, antenna size, transmitter power, frequency band, system configuration, or any other setting or parameter governing bandwidth of an electromagnetic signal.

Referring again to FIG. 1A, in view of the foregoing, the downlink IF input 4 contains a signal of greater bandwidth than the uplink IF input 6 and one or more signals of interest. The uplink IF input 6 is a real-time copy of the uplink signal, or a replica of the interfering signal, being sent to the satellite or other transmission device. The downlink IF input 4, however, contains an interfering signal that may be scaled, phase and frequency shifted, and time delayed relative to the replica of the interfering signal available at the uplink IF input 6. This is because the replica of the interfering signal has been required to travel up to the satellite and back down (round trip delay), or has been transmitted from a moving transmission device (Doppler shifting). Because of other signal processing operations and transmission considerations, additional time delays and/or frequency offsets to the interfering signal contained in the downlink IF input 4 may exist. The purpose of the portion of the frequency reuse system 2 illustrated in FIG. 1A is to adjust the timing and frequency offset of the replica of the interfering signal contained in the uplink IF input 6 to match that of the interfering signal in the composite signal contained in the downlink IF input 4. Once the timing and frequency offset are synchronized, the interfering signal in the composite signal can be cancelled and the remaining downlink signal(s) sent to a radio frequency demodulator for further processing, thus allowing the signals of interest to be retrieved.

To enable the cancellation, the system 2 utilizes an IF pre-processing module 8 and an IF processing module 10 coupled together to discard unwanted signal and noise and to set the bandwidth of the IF signals being processed. The processing creates two bandlimited intermediate frequency signals. In particular implementations, a bandpass filter (often a SAW filter) is used to set the bandwidth of the two IF signals at 10 MHz. After processing, the bandlimited intermediate frequency signals (both the uplink and downlink) pass through a first analog to digital converter 12 and a second analog to digital converter 14 and then are processed by a digital down conversion module 16. The digital down conversion module 16 reduces the digitized bandlimited intermediate frequency signals to baseband (or I and Q) signals, forming a downlink baseband signal 18 and an uplink baseband signal 20 ready for processing by a baseband module 22. The baseband module 22 performs the cancellation of the uplink baseband signal 20 from the downlink baseband 18. After cancellation, the remaining portion of the downlink baseband signal is processed by a digital up conversion module 24 and a digital to analog converter 26 before being reprocessed into an IF signal by an output IF processing module 28. The IF signal is then sent to one or more radio frequency demodulators for further processing.

Referring to FIG. 1B, a block diagram of the various modules included in a particular implementation of a baseband processing module 22 like that illustrated in FIG. 1A is illustrated. As illustrated, a downlink baseband signal and uplink baseband signal enter the baseband processing module. The downlink baseband signal includes the composite received signal (composite signal), a signal composed of the combination of the interfering signal with one or more downlink signals, or signals of interest from other locations. Accordingly, the composite received signal can be considered to include at least two or more signals; one of the signals being the interfering signal and the other signals a signal of interest. Also, in particular implementations the downlink baseband signal may also include three or more signals, one of which being the interfering signal and two or more being signals of interest. In all implementations, one of the signals in the downlink baseband signal (for example, the interfering signal) corresponds with the interfering signal sent to the satellite or other transmitter. The composite received signal occupies a composite bandwidth; the interfering signal and the signal of interest each occupy a first bandwidth and second bandwidth, respectively.

An uplink baseband signal also enters the baseband processing module 22 and contains a real-time copy of the uplink signal sent to the satellite or other transmitter. This real-time copy can be referred to as a replica of the interfering signal which has an interference bandwidth. In particular implementations of the system 2, both the composite received signal and the replica of the interfering signal have bandwidths nominally of 10 MHz as they approach the baseband processing module 22. Within the baseband processing module 22, various other modules are coupled together including a delay and frequency estimation module 24, a digital phase locked loop (PLL) module 26, a delay module 28, a delay tracking module 30, an adaptive filter 32, a tap update module 34, and an automatic gain control (AGC) module 36. Relevant disclosure regarding the structure, use, and function of these modules may be found in the patent to Collins et al. previously incorporated herein by reference.

Referring to FIG. 3, a particular implementation of the baseband processing portion or a signal filtering system 37 of a frequency reuse system 2 is illustrated. As illustrated, a downlink bandwidth filter 38 is coupled with the downlink baseband signal or composite received signal prior to the baseband processing module 22. The downlink bandwidth filter 38 may be, by non-limiting example, a decimating filter, a polyphase filter, a bank switchable low pass filter, or any other bandwidth adjusting filter. The downlink bandwidth filter 38 reduces the composite bandwidth of the composite received signal. In particular implementations, the amount of bandwidth reduction may correspond to about the second bandwidth of the signal of interest. In other implementations, the bandwidth reduction may be less, depending upon system requirements.

Because the bandwidth of the composite received signal is reduced by the downlink bandwidth filter 38, the baseband processing module 22 need not process the composite received signal across the entire original composite bandwidth (which may be 10 MHz in particular implementations). Accordingly, the baseband processing module 22 may save processor time, power, and other resources. For example, in the T1 link previously described, the composite bandwidth occupies only about 2 MHz of the total 10 MHz of the signal; using the downlink bandwidth filter 38 requires the baseband processing module 22 to process 80% less bandwidth of the composite received signal than before.

To further aid in reducing the bandwidth to be processed by the bandwidth processing module 22, an uplink bandwidth filter 40 may also be coupled with the uplink baseband or replica of the interfering signal prior to the baseband processing module 22. The uplink bandwidth filter 40 reduces the interference bandwidth of the replica of the interfering signal, and may, in particular implementations, reduce the interference bandwidth to substantially the second bandwidth of the signal of interest. Accordingly, instead of the bandwidth processing module 22 being required to process the entire interfering bandwidth (which may be 10 MHz in particular implementations), only the bandwidth corresponding to the uplink signal may be used for processing, which can represent a significant reduction. When both a downlink bandwidth filter 38 and uplink bandwidth filter 40 are employed, the bandwidth required for processing by the bandwidth processing module 22 may be minimized, and may reduce processor time, save power, and create other operational efficiencies.

Generally, the use of both a downlink bandwidth filter and an uplink bandwidth filter is required to permit cancellation of the interfering signal in the baseband processing module 22. In addition, the downlink bandwidth filter and the uplink bandwidth filter must have the same impulse response in order for the cancellation to be successful. While the same components need not be used in each of the downlink bandwidth and uplink bandwidth filters, the overall effect of the components used needs to be identical. Because the frequency reuse system 2 is a linear system, the uplink bandwidth filter could be included on the transmit side as well as on the receive side, which would reduce the amount of bandwidth being sent across the link. While the implementation of a signal filtering system 37 illustrated in FIG. 3 employs both a downlink bandwidth filter 38 and uplink bandwidth filter 40, other particular implementations may only utilize one of the two, depending upon system requirements.

In addition, in implementations of a signal filtering systems 37 intended to process composite received signals containing three or more signals, the remaining two or more signals of interest, after cancellation of the interfering signal, may be sent to two or more demodulating modules 42, 44, 46 after conversion back to IF signals for processing to allow the data in the signals to be retrieved. Because the remaining two or more signals of interest occupy different frequency ranges, the various demodulators 42, 44, 46 may be individually tuned to demodulate only the frequency corresponding with the signal which they are to receive.

Figure 4:
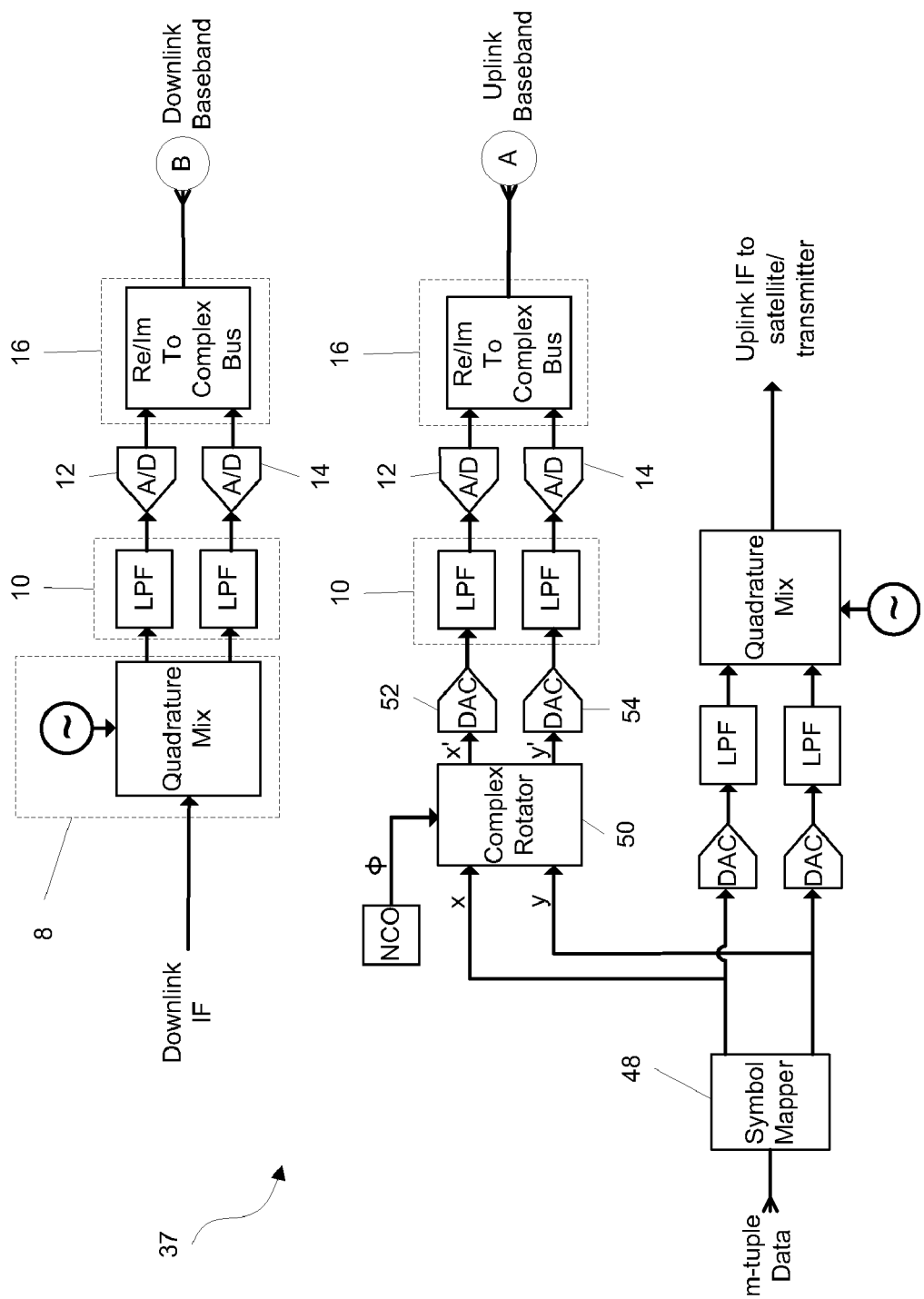
FIG. 4 is a block diagram of an implementation of a downlink baseband complex rotator and an uplink baseband complex rotator.
Figure 5:
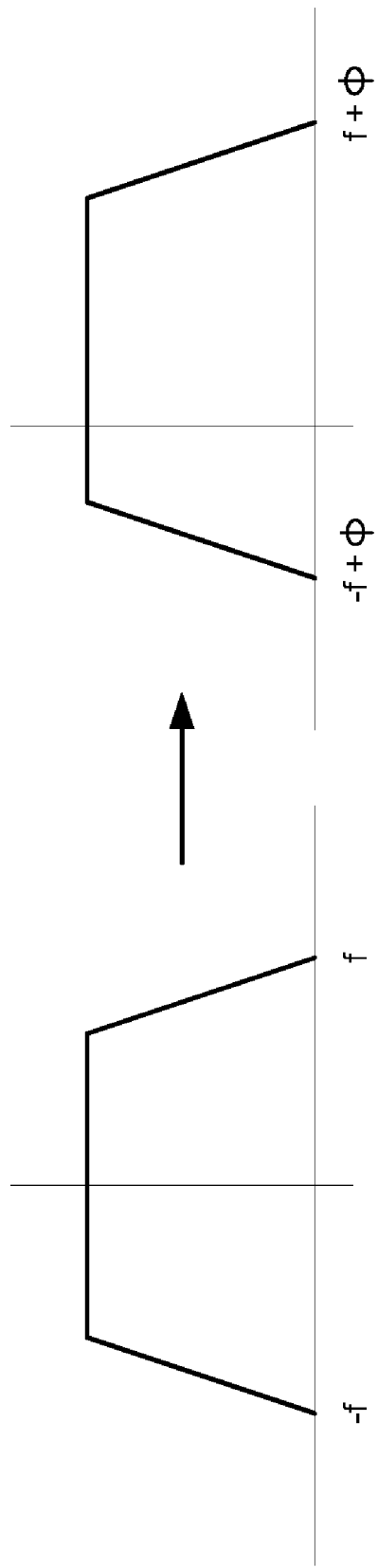
FIG. 5 is an illustration of the bandwidth of a baseband signal before and after frequency translation.

Referring to FIGS. 3 and 4, a further aspect of implementations of signal filtering systems 37 and frequency reuse systems 2 is illustrated. As illustrated in FIG. 4, the downlink IF signal 4 is processed through the IF preprocessing module 8 (which may be a quadrature mixing module in particular implementations), an IF processing module 10 (which may be a pair of low pass filters (LPF) in particular implementations), and a pair of analog to digital converters 12, 14 before being processed by a digital down conversion module 16 [which may be a real/imaginary (Re/Im) to complex bus module in particular implementations] to produce a downlink baseband or composite received signal. The downlink baseband signal of FIG. 4 corresponds with the downlink baseband signal of FIG. 3 at indicator B.

However, because the uplink IF signal 6 is a replica of the interfering signal being sent directly to the satellite or transmitter, its values originate directly as a copy of the real and imaginary symbols generated by the symbol mapper 48 in the modulator portion of the frequency reuse system 2. Because the values are still digital, rather than analog, particular implementations of signal filtering systems 37 may employ a complex rotator 50 coupled with a pair of digital to analog converters (DAC) 52, 54 to both shift the frequency of the resulting copy of the uplink signal and to convert the copy from digital to an analog IF signal. After processing by the digital to analog converters 52, 54, the copy of the uplink signal in IF form is processed by the IF pre-processing module 10, the pair of analog to digital converters 12, 14, and the digital down conversion module 16, thus becoming the uplink baseband signal or replica of the interfering signal. The uplink baseband signal illustrated on FIG. 4 corresponds with the uplink baseband signal of FIG. 3 at indicator A.

The complex rotator 50 illustrated in the particular implementation of a signal filtering system 37 includes four multipliers and two adders coupled with a numerically coupled oscillator (NCO) that serve to shift the center of the frequency position of the signal from zero to an offset Φ. Referring to FIG. 4, the process is illustrated by the movement of the bandwidth curve from −f to f to −f+Φ to f+Φ. In addition, where the input real component of the copy of the uplink signal is x, the resulting signal after complex rotation may be $x'=x\cos(\Phi)-y\sin(\Phi)$ and the imaginary component y may be $y'=j(y\cos(\Phi)+x\sin(\Phi)$. A wide variety of methods and systems could be employed to accomplish the complex rotation including, by non-limiting example, the CORDIC algorithm or any other system, algorithm, or any combination of a system and an algorithm configured to shift the frequency of a digital signal.

Figure 7:
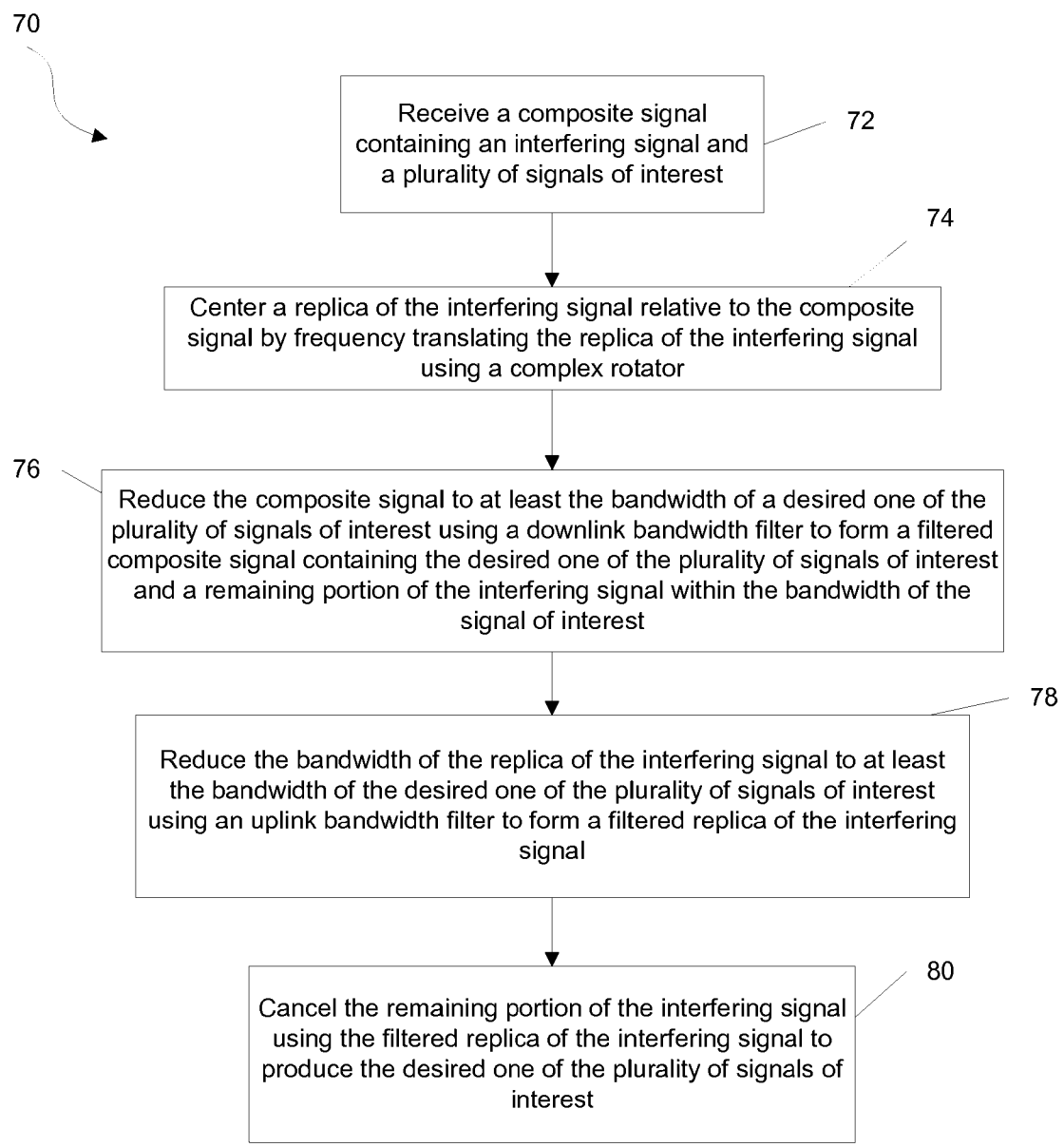
FIG. 7 is a flow diagram of an implementation of a method of obtaining a signal of interest from a plurality of signals of interest included in a composite signal.

Implementations of bandwidth filtering systems 37 employing a complex rotator 50 may allow the uplink baseband or replica of the interfering signal to be shifted to a frequency offset relative to the downlink baseband signal. Because of this, implementations of bandwidth filtering systems 37 employing a complex rotator 50 may utilize implementations of a method of obtaining a signal of interest from a plurality of signals of interest included in the composite signal 70. Referring to FIG. 7, an implementation of the method 70 is illustrated including the steps of receiving a composite signal containing an interfering signal and a plurality of signals of interest (step 72) and centering a replica of the interfering signal relative to the composite signal by frequency translating the replica of the interfering signal using a complex rotator (step 74). The method may also include reducing the composite signal to at least the bandwidth of a desired one of the plurality of signals of interest using a downlink bandwidth filter to form a filtered composite signal containing the desired one of the plurality of signals of interest and a remaining portion of the interfering signal within the bandwidth of the desired one of the plurality of signals of interest (step 76). The method also includes reducing the bandwidth of the replica of the interfering signal to at least the bandwidth of the desired one of the plurality of signals of interest using an uplink bandwidth filter to form a filtered replica of the interfering signal (step 78). The method may also include canceling the remaining portion of the interfering signal using the filtered replica of the interfering signal to produce the desired one of the plurality of signals of interest (step 80).

The foregoing method steps may be repeated to allow an additional one, or each of the plurality of signals of interest to be obtained from the composite signal. The method may also permit the processing of a received composite signal with a number of signals of interest (like that illustrated in FIG. 2C) by processing specific bandwidth sections of the received composite signal that correspond with the particular one of the plurality of signals of interest. In addition, the method may also allow processing of only the portion of the replica of the interfering signal required to retrieve the particular signal of interest from the bandwidth limited portion of the received composite signal. Because the portion of the replica of the interfering signal used for canceling the interfering signal from the received composite signal (the filtered replica of the interfering signal) may be offset in frequency relative to the particular bandwidth filtered portion of the received composite signal (the filtered composite signal) after the bandwidth filtering operation, the complex rotator is used to center the filtered replica of the interfering signal relative to the composite received signal. The centering permits proper cancellation of the interfering signal by the baseband processing module. Because both the received composite signal and the replica of the interfering signal are processed while bandwidth filtered, the amount of processing time and system resources may also be reduced.

Figure 6:
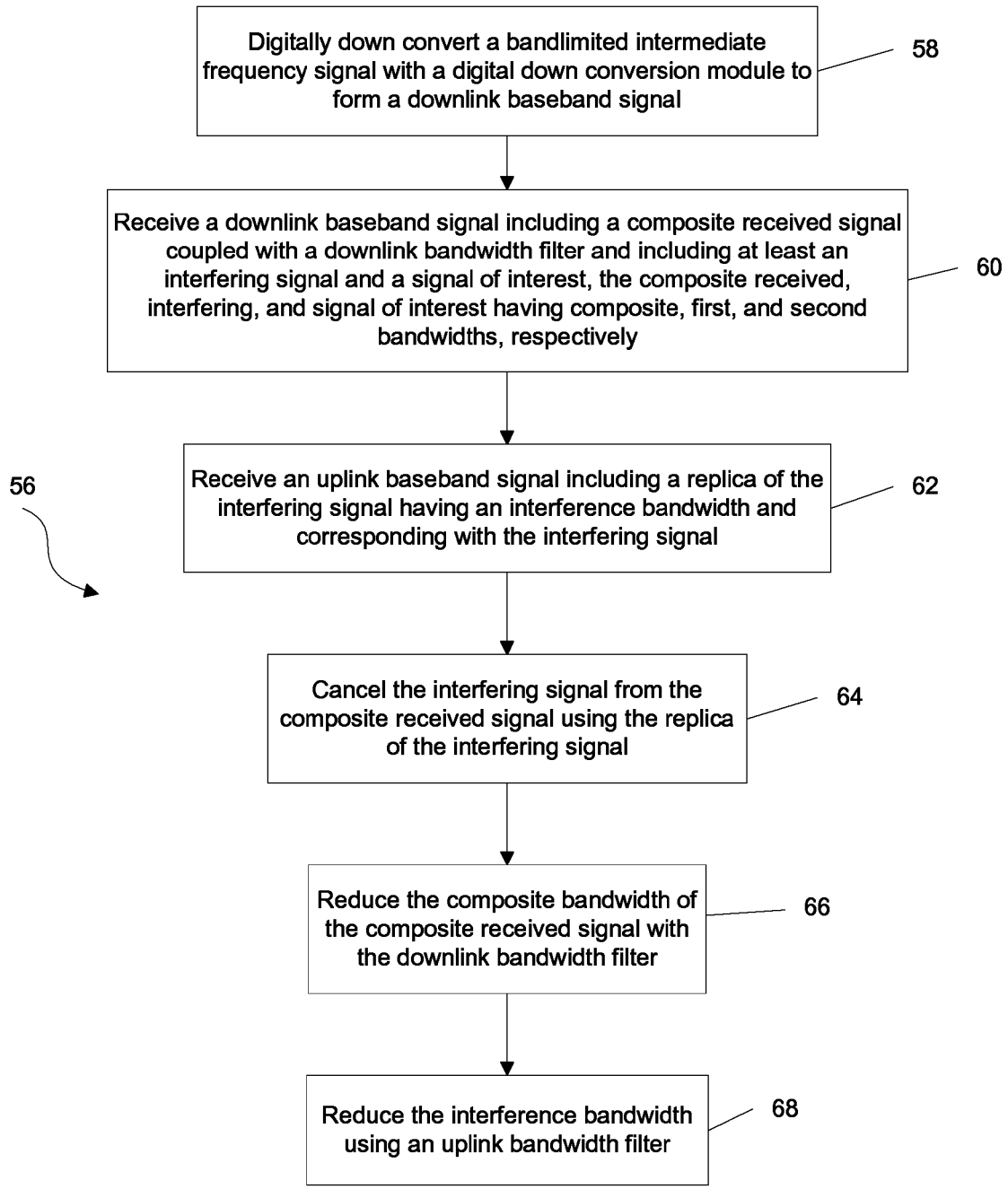
FIG. 6 is a flow diagram of an implementation of a method of bandwidth filtering for a frequency reuse system.

Referring to FIG. 6, an implementation of a method of bandwidth filtering for a frequency reuse system 56 is illustrated. The method may include digitally down converting a bandwidth limited IF signal with a digital down conversion module to form a downlink baseband signal (step 58). The digital down conversion may take place prior to receiving a downlink baseband signal including a composite received signal coupled with a downlink bandwidth filter (step 60) in particular implementations. The composite received signal may include an interfering signal and a signal of interest, and each may have a composite, first, and second bandwidths, respectively. The method may further include receiving a uplink baseband signal including an replica of the interfering signal having an interference bandwidth corresponding with a replica of the interfering signal (step 62) and canceling the interfering signal from the composite received signal using the replica of the interfering signal (step 64). The method may include reducing the composite bandwidth of the composite received signal with the downlink bandwidth filter (step 66) and reducing the interference bandwidth using an uplink bandwidth filter (step 68). In particular implementations of the method 56, the method may include translating the frequency of the replica of the interfering signal using an uplink baseband complex rotator.

While the implementation of the method 56 illustrated in FIG. 6 includes the steps of reducing the interference bandwidth using an uplink bandwidth filter 68 and reducing the composite bandwidth of the composite received signal with the downlink bandwidth filter 66, particular implementations of the method 56 may include only one of the two steps. Many other method steps and arrangements of the method steps are possible.

In places where the description above refers to particular implementations of frequency reuse systems or bandwidth filtering systems, it should be readily apparent that a number of modifications may be made without departing from the spirit thereof and that these implementations may be applied to other frequency reuse systems and bandwidth filtering system implementations.

The invention claimed is:

1. A signal filtering system for a frequency reuse system comprising:
   a downlink baseband signal comprising a composite received signal comprising at least an interfering signal and a signal of interest, the composite received signal having a composite bandwidth, the interfering signal having a first bandwidth, and the signal of interest having a second bandwidth, and the downlink baseband signal coupled with a downlink bandwidth filter;
   an uplink baseband signal comprising a replica of the interfering signal comprising a interference bandwidth and corresponding with the interfering signal, the uplink baseband signal coupled to a uplink bandwidth filter; and
   a baseband processing module coupled with the downlink bandwidth filter and the uplink bandwidth filter, the baseband processing module configured to cancel the interfering signal from the composite received signal using the replica of the interfering signal;
   wherein the downlink bandwidth filter is configured to reduce the composite bandwidth of the composite received signal and the uplink bandwidth filter is configured to reduce the interference bandwidth of the replica of the interfering signal; and
   wherein an impulse response of the downlink bandwidth filter and an impulse response of the uplink bandwidth filter are the same.

2. The system of claim 1, wherein the downlink bandwidth filter is further configured to reduce the composite bandwidth to at least the second bandwidth.

3. The system of claim 1, wherein the uplink bandwidth filter is configured to reduce the interference bandwidth to substantially correspond with the second bandwidth.

4. The system of claim 3, wherein the system further comprises an uplink baseband complex rotator coupled with the uplink baseband signal, the uplink baseband complex rotator configured to translate a frequency of the replica of the interfering signal of the uplink baseband signal.

5. The system of claim 4, wherein the composite received signal further comprises three or more signals and one of the three or more signals is the interfering signal.

6. The system of claim 5, wherein the system further comprises two or more demodulators corresponding with two or more signals of interest included in the three or more signals included in the composite received signal.

7. The system of claim 4, wherein the baseband processing module comprises a delay module, a delay and frequency estimation module, a delay tracking module, a digital phase locked loop module, an adaptive filter, a tap update, and an automatic gain control module all operatively coupled together.

8. A method of bandwidth filtering for a frequency reuse system, the method comprising:
   receiving a downlink baseband signal comprising a composite received signal comprising at least an interfering signal and a signal of interest, the composite received signal having a composite bandwidth, the interfering signal having a first bandwidth, and the signal of interest having a second bandwidth, and the downlink baseband signal coupled with a downlink bandwidth filter;

receiving an uplink baseband signal comprising a replica of the interfering signal comprising a interference bandwidth and corresponding with the interfering signal;

cancelling the interfering signal from the composite received signal using the replica of the interfering signal;

reducing the composite bandwidth of the composite received signal with the downlink bandwidth filter; and reducing the interference bandwidth of the replica of the interfering signal to substantially correspond with the second bandwidth using an uplink bandwidth filter coupled with the uplink baseband signal.

9. The method of claim 8, wherein reducing the composite bandwidth of the composite received signal further comprises reducing the composite bandwidth to at least the second bandwidth.

10. The method of claim 8, wherein an impulse response of the downlink bandwidth filter and an impulse response of the uplink bandwidth filter are the same.

11. The method of claim 10, further comprising translating a frequency of the replica of the interfering signal using an uplink baseband complex rotator coupled with the uplink baseband signal.

12. The method of claim 11, further comprising transmitting the signal of interest to a demodulator.

13. The method of claim 8, further comprising digitally down converting a bandlimited intermediate frequency signal with a digital down conversion module to form the downlink baseband signal prior to receiving the baseband signal comprising the composite received signal.

14. A signal filtering system for a frequency reuse system comprising:
a downlink bandwidth filter coupled to a downlink baseband input and configured to receive a downlink baseband signal comprising a composite received signal comprising at least an interfering signal and a signal of interest, the composite received signal having a composite bandwidth, the interfering signal having a first bandwidth, and the signal of interest having a second bandwidth;

an uplink bandwidth filter coupled to an uplink baseband input and configured to receive an uplink baseband signal comprising a replica of the interfering signal comprising a interference bandwidth and corresponding with the interfering signal; and a baseband processing module coupled with the downlink bandwidth filter and the uplink bandwidth filter, the baseband processing module configured to cancel the interfering signal from the composite received signal using the replica of the interfering signal;

wherein the downlink bandwidth filter is configured to reduce the composite bandwidth of the composite received signal and the uplink bandwidth filter is configured to reduce the interference bandwidth of the replica of the interfering signal; and wherein an impulse response of the downlink bandwidth filter and an impulse response of the uplink bandwidth filter are the same.

15. The system of claim 14, wherein the downlink bandwidth filter is further configured to reduce the composite bandwidth to at least the second bandwidth.

16. The system of claim 14, wherein the uplink bandwidth filter is configured to reduce the interference bandwidth to substantially correspond with the second bandwidth.

17. The system of claim 16, wherein the system further comprises an uplink baseband complex rotator coupled with the uplink baseband signal, the uplink baseband complex rotator configured to translate a frequency of the replica of the interfering signal of the uplink baseband signal.

18. The system of claim 17, wherein the composite received signal further comprises three or more signals and one of the three or more signals is the interfering signal.

19. The system of claim 18, wherein the system further comprises two or more demodulators corresponding with two or more signals of interest included in of the three or more signals included in the composite received signal.

20. The system of claim 17, wherein the baseband processing module comprises a delay module, a delay and frequency estimation module, a delay tracking module, a digital phase locked loop module, an adaptive filter, a tap update, and an automatic gain control module all operatively coupled together.

* * * * *